Oct. 2, 1945.     E. F. FLINT     2,385,978
OPTICAL INSTRUMENT
Filed Oct. 17, 1942     4 Sheets-Sheet 1

EDWARD F. FLINT
INVENTOR

EDWARD F. FLINT
INVENTOR
ATTORNEYS

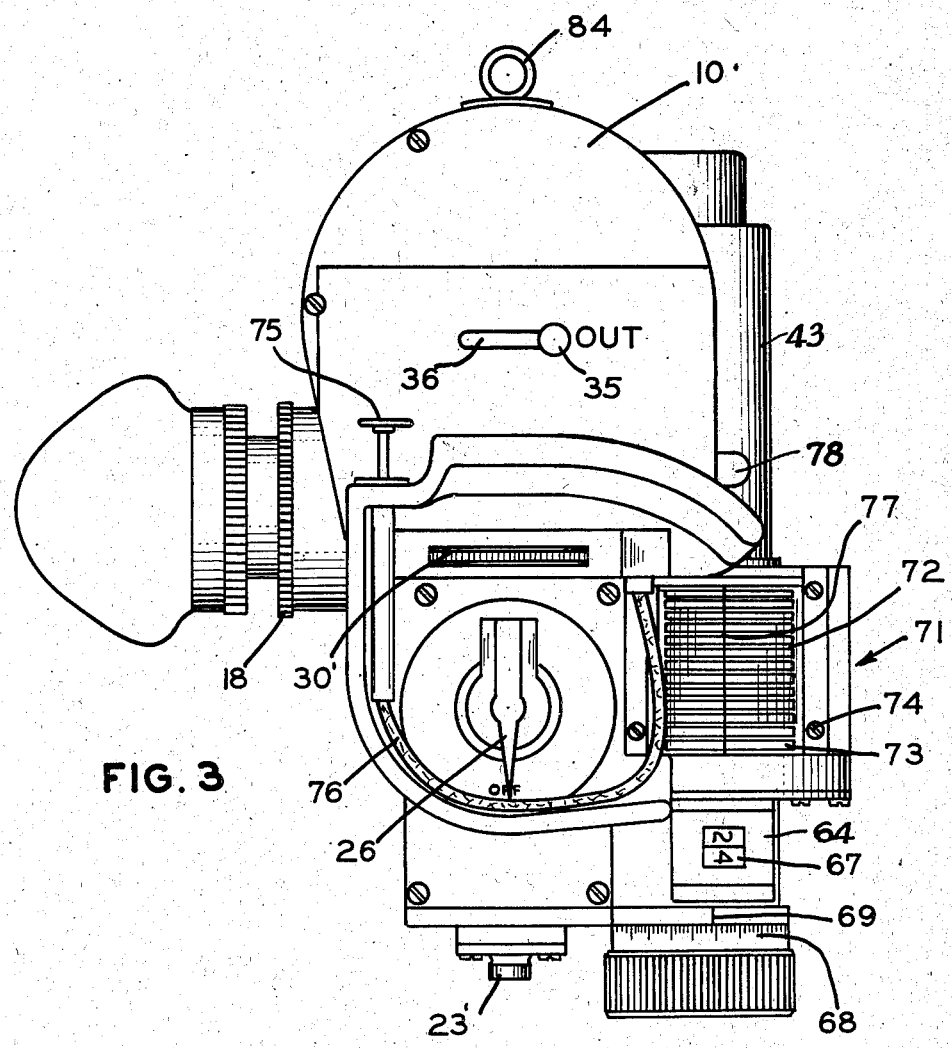

Oct. 2, 1945.  E. F. FLINT  2,385,978
OPTICAL INSTRUMENT
Filed Oct. 17, 1942  4 Sheets-Sheet 4

EDWARD F. FLINT
INVENTOR
ATTORNEYS

Patented Oct. 2, 1945

2,385,978

UNITED STATES PATENT OFFICE 2,385,978

OPTICAL INSTRUMENT

Edward F. Flint, Rochester, N. Y., assignor to Bausch & Lomb Optical Company, Rochester, N. Y., a corporation of New York Application October 17, 1942, Serial No. 462,379

3 Claims. (Cl. 88—2.4)

This invention relates to optical instruments and more particularly to an optical measuring instrument for measuring the angular elevation of a celestial body above an artificial or true horizon.

The instrument of the present invention is particularly adapted for use with aircraft and will be described as an aircraft octant, although it will be apparent that the instrument may be used for marine navigation.

In present-day aircraft capable of long-distance flights, the octant is an important adjunct for it is a simple means by which the navigator can accurately locate the position of the aircraft. The instrument must then be accurate and as the navigator works in a limited space, it must also be compact.

Many of the large aircraft are provided with astro-domes or observation blisters, which to reduce air resistance, are formed just large enough to accommodate the octant and a portion of the observer's head. Many octants now in use cannot be used with such blisters as in some the observer must hold the instrument below the level of his eye while in others, the observer must hold the instrument elevated while he sights up through the instrument.

The device of the present invention is particularly adapted to use with observation blisters for the instrument can be used when level with the eye of the observer. To permit even the real horizon or a celestial body close to the real horizon to be viewed from a shallow astro-dome or observation blister, the central entrance ray of the octant of the present invention is a substantial distance above the eyepiece of the instrument. The periscope feature is accomplished without sacrificing compactness by offsetting the vertical plane of the eyepiece and bubble from the plane of measurement of the instrument. This is accomplished by the optical system of the device which forms an erect and normal right to left image without the use of expensive roof prisms.

Where a greater periscopic action is desired, and to increase the size of the field, a telescopic system of lenses may be interposed between the index reflector and objective of the instrument. Such an instrument might, if desired, be so mounted as to be used as a panoramic instrument.

The bubble cell is so placed in the optical system that the images of the bubble and celestial body will move in the same direction. The curve of the bubble lens, as now preferred, is formed in the focal plane of the objective and the images will also move at the same speed so that coincidence can be made anywhere in the vertical measurement plane of the bubble field. This simplifies the use of the instrument particularly in a rolling or pitching aircraft.

To even simplify the use of the device further, the bubble of the octant of the present invention is not superimposed on the plane of the objective but is actually in the plane of the objective and squeezed between the two lenses of the bubble cell in such a manner that the image of the celestial body is viewed through the bubble. The bubble appears as a dark ring or annulus during day use and at night as an illuminated ring or annulus on a dark field and coincidence is made by bringing the image of the celestial body within the annulus.

To increase the contrast between the image of the bubble and the celestial body during night use, the lamp is colored or housed within a colored sheath thereby causing the bubble to be illuminated in the color of the lamp or sheath.

The instrument of the present invention provides means for viewing the real horizon and in the now preferred embodiment of the invention, this means comprises a prism movably mounted on the instrument. When it is desired to view the real horizon, this prism is moved into the optical path of the instrument. As the real horizon prism slides into and out of the optical path of the instrument, there is no loss in field brightness due to reducing the entrance pupil aperture as in previous instruments in which the prism was fixed on the instrument in the optical path thereof and blanked out by a suitable shutter when not in use.

To permit an observer to make daylight observations, a plurality of filters are mounted on the instrument for movement into and out of the optical path as the same are carried about the periphery of a rotatably mounted disc. The disc also carries means for elongating the image of the celestial body and in the preferred form of the device, this means comprises an astigmatizing lens.

The disc is so mounted on the instrument that the filter and astigmatizer do not change the focal point of the objective as they are moved into the optical path of the instrument intermediate the index reflector and the objective. This eliminates the necessity of compensating for the filters or astigmatizer when they are not in use and simplifies the operation of the instrument.

As the filters and astigmatizer are carried by the one mount and there is no need for any compensating lenses when the former are not in use, the number of actuating members is reduced to a minimum.

Other objects and advantages of the present invention will appear in the following description taken in connection with the accompanying drawings in which:

Fig. 3 is a side elevational view taken from the side opposite to that of Fig. 1.

Fig. 6 is a section taken along line 6—6 of Fig. 1.

Fig. 7 is a section taken along line 7—7 of Fig. 6.

Figure 1:
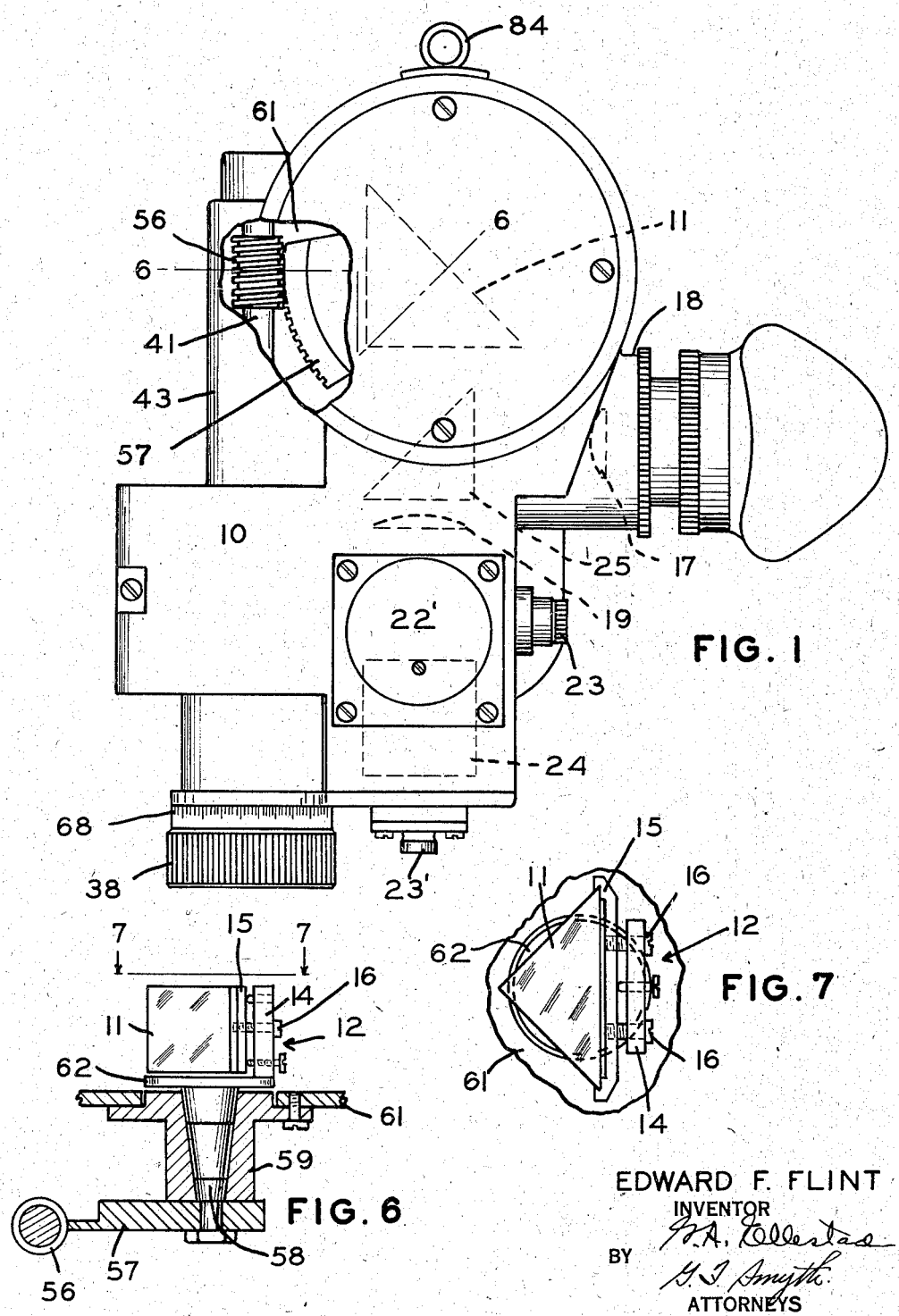
Fig. 1 is an elevational view partly in sections and showing a portion of the optical system in broken lines.
Figure 2:
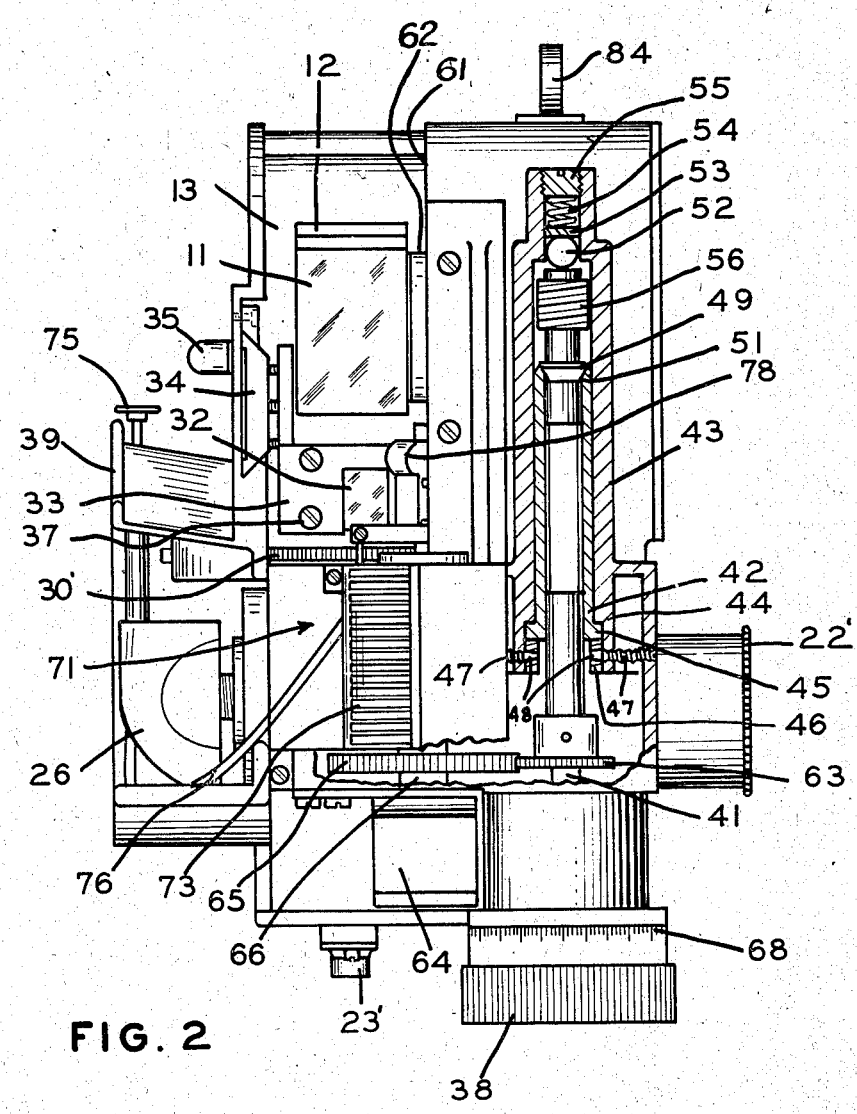
Fig. 2 is a front view in elevation of the instrument of the present invention with a portion of the casing broken away to show the operating mechanism thereof.

The instrument of the present invention, referring now to the drawings, comprises a casing 10 housing the optical system, a part of which is shown by broken lines in Fig. 1, and the operating mechanism of the instrument.

The optical system in the now-preferred form comprises an index prism 11 mounted in a carrier 12 pivotally mounted in a recess 13 formed in the front face of the casing 10. The carrier 12 comprises a pair of plates 14 and 15 secured together in a spaced relation by a plurality of screws 16. The plate 15 is formed with a re-entrant notch for taking the base of the prism 11 and selective operation of the screws 16 adjusts the relative position of the plates 14 and 15 and consequently the position of the prism 11. This adjustment of the prism makes it possible to easily align the same with the other elements of the optical system.

The eyepiece of the system comprises an eye lens 17 carried by an ocular tube 18, projecting from the casing 10 and a collective lens 19 mounted within the casing. The ocular tube 18 carries the usual eye guard and may include a pair of telescoping sections relatively adjustable to permit the eyepiece to be focused by the user.

To render celestial bodies of small magnitude visible and to increase the clearness of the image of the body, it is preferred to form the eye lens and collective lens so that there is some telescope power. Any power desired can be obtained by varying the equivalent focal length of the eyepiece relative to the equivalent focal length of the objective 20. The power of the system is preferably one which will bring out crisp images of the celestial bodies observed but should not be so high as to make the instrument difficult to hold on the body observed.

The objective 20 in the form now preferred is achromatic and has an equivalent focal length equal to the radius of the bubble lens curve 21 of the bubble cell 22 and the center of curvature of the bubble lens curve lies in the principal plane of the objective 20. Thus the bubble 21' is not superimposed on the focal plane of the objective, but is actually viewed in that plane and movement of the bubble 21' is constrained to an arc coincident with the focal plane of the objective.

The bubble cell 22 will not be described in detail, for this cell is fully described and claimed in my prior application, Serial No. 439,517, filed April 18, 1942, now Patent No. 2,306,874, dated December 29, 1942, and only such details of the cell will be recited here as are necessary to the understanding of the present invention. If desired, the bubble may be illuminated by a lamp 23 as described in another prior application, Serial No. 428,583, filed by me on January 28, 1942, now Patent No. 2,344,241, dated March 14, 1944.

To facilitate the use of the instrument, the bubble 21' is compressed between the two lenses of the bubble cell 22 and the bubble during daylight use appears in the form of an annulus. This permits an observer to view the celestial body through the bubble and coincidence is made by bringing the image of the body within the image of the bubble. If the bubble cell is illuminated as described in my prior application Serial No. 428,583, the bubble appears as an illuminated annulus on a dark field and the contrast between the illuminated annulus and the celestial body observed can be increased by coloring the lamp 23. I have found that if a red lamp is used, the bubble will appear red in the bubble field which increases the contrast between the bubble and substantially white celestial body during night observations. The contrast can also be brought about by placing over the lamp a colored sheath which permits the ordinary white incandescent lamp to be used.

The lamp 23 is connected by suitable conductors to a receptor plug 23' which is adapted to receive an attachment plug of a lead-in conductor connected to some suitable source of current. A rheostat, not shown, is connected into the lamp circuit and the amount of current passing through the lamp can be adjusted by manipulation of the rheostat operator shown at 26 in Fig. 3 of the drawings. In the preferred form of the rheostat, the operating handle 26 also serves as a switch operator for making and breaking the lamp circuit.

The bubble of the bubble cell described and claimed in my prior application, Serial No. 439,517, is adjustable and in the present adaptation of this bubble cell to the octant of the present invention, the actuating member is shown at 22'. The particular location of the actuating member permits the size of the bubble to be adjusted even while the observer is viewing a celestial body.

As the bubble lens curve lies in the focal plane of the objective, the images of the celestial body and bubble will move at the same speed, but as the images formed by the eyepiece and objective are reversed as well as inverted, the images will move in opposite directions.

To reverse and invert the image formed by the eyepiece and objective, a reversing prism 24 is mounted within the casing 10 in such a manner that the exit ray of the prism is reversed and displaced laterally from the entrance ray of the same. Thus the image is reversed and the optical path is bent back so that the system can be mounted within a smaller casing than would be possible where the optical path lies in the one plane.

Although any means desired may be used to invert the image, in the form of the invention now preferred a prism 25 placed between the collective 19 and eye lens 17 cooperates with the index prism 11 to turn the image inverted by the eyepiece and objective 180° about the horizontal axis of the same. Accordingly, the images formed by the optical system are normal, that is, erect and normal right to left. The bubble cell 22 is so disposed in the optical system that the bubble will move at the same rate of speed and direction as the image of the body observed and coincidence can be made anywhere in the vertical measurement plane of the bubble field. This simplifies the use of the instrument, particularly in a yawing aircraft subjected to phugoid oscillations.

The particular disposition of the prisms of the optical system brings about a periscopic effect which permits the instrument to be used in shallow observation blisters. As observations are made with the ocular tube 18 level with the eye of the observer, this not only allows head room in the blister but also permits an observer to view from the blister the real horizon or celestial bodies close to the real horizon.

To reduce the intensity of certain celestial bodies, such as the moon or sun in the bubble field, a plurality of filters 27 of different densities are carried by a filter disc 28. The disc 28 in the form of the invention now preferred is rotatably mounted on the casing in such a position that the filters 27, carried about the periphery thereof, may be rotatably moved into the optical path of the instrument.

The disc 28 in addition to the filters 27 carries an astigmatizing lens 29 which is moved into the optical path of the instrument when it is desired to astigmatize or elongate an image of the observed body.

The disc 28 is also formed with an aperture 30 which is moved into proper position when there is little contract between the celestial body observed and the sky.

Thus the position of either of the filters 27, the astigmatizing lens 29, or apertures 30 are controlled through one actuating member which in the preferred embodiment of the invention, as shown, comprises the edge face 30' of the disc 28. The face is knurled as shown so as to facilitate the actuation thereof and the disc 28 is so mounted, referring now to Fig. 3, that it can be adjusted even while the observer is making an observation.

Due to the position in the optical path which the filters 27 or astigmatizer 29 occupy when moved therein, there is no need to compensate for their effect in the optical path. The filters or astigmatizer are inserted in the optical path intermediate the index prism 11 and the objective 20 and as the light rays are parallel in that portion of the path, the focal point of the objective is not affected and the use of the octant of the present invention is not complicated by additional actuators for moving compensating lenses into the optical path when the filters are not in use.

To further reduce the intensity of the sun in the bubble field, a separable filter 31 may be frictionally mounted in position in a rotatable mount carried by the ocular tube 18. This filter can also include a polarizing screen to reduce sun glare when the sun is being observed close to the horizon over the surface of a body of water.

In some instances it is desirable to use the real horizon as the datum plane and to permit the real horizon to be viewed, a prism 32 supported by a carrier 33 mounted in the recess 13 is movable into the optical path of the instrument. The carrier 33 includes a slide 34 movable in a groove formed in the face of one wall of the recess 13 and is actuated by a knob 35 projecting through the wall of the casing 10 and operating in a slot 36, the opposite end walls of which limit the movement of the knob and determine the position of the real horizon prism relative to the optical path of the instrument. As the prism 32 may be moved out of the optical path of the instrument and is not blanked out by a shutter or the like as in prior instruments, there is no loss in field brightness.

The position of the prism 32 may be adjusted relative to the carrier by means of a plurality of screws 37 interconnecting the slide 34 and the carrier 33. This permits less accurate machine operation when the groove and slide are formed and lessens the cost of the instrument.

As the real horizon prism, when in use, is disposed in the optical path just adjacent the index prism 11, it may be made much smaller than if it was mounted in the ocular tube as in prior instruments. The prism 32 is so disposed relative to the entrance aperture of the instrument that it divides the field of the instrument in the measurement plane and thus an image reflected into the instrument by the prism 32 can be made coincident with an image reflected into the instrument by the index prism 11.

The position of the index prism 11 is adjusted to bring the image of an observed body into coincidence with the image of the bubble by an operating knob 38. The knob 38 is mounted on the underside of the instrument and in the use of the instrument is actuated by the left hand as the handle 39 of the instrument is grasped by the right. The knob is fixed to a shaft 41 journalled in a bushing 42 housed within a tubular portion 43 of the casing 10. The bore of the tubular portion 43 is formed with an annular shoulder 44 against which a flange 45 of the bushing 42 seats. The flange 45 is held on the shoulder 44 by a band 46 fixed in the bore of the tubular portion 43 of the casing 10 by screws 47 threaded into diametrically opposed apertures formed in the wall of the tubular portion 43. The one end of each screw 47 carries a conical plug 48 which is received in a tapered aperture formed in the band 46. The apertures are normally displaced vertically downward from the screw-receiving apertures of the casing part 43 so that the conical plugs 48 as they enter the tapered apertures, urge the band up against the flange 45 and hold the same tightly against the shoulder 44.

The shaft 41 carries an annular tapered bearing 49 engaging a conical bearing surface 51 formed at the mouth of the bushing 42. A thrust bearing comprising a ball 52 is held in engagement with the end of the shaft 41 by a spring-pressed retaining plate 53. The plate is urged against the ball 52 by a spring 54 seating on a plug 55 threaded into the upper end of the tubular portion 43 of the casing. The ball not only takes the thrust of the shaft 41 but also through the action of the spring 54 and retaining plate 53, holds the conical bearing 49 against the bearing surface 51 of the bushing 42 even though in use the engaged surfaces may become worn.

A worm 56 fixed to the shaft 41 engages and drives a sector gear 57 carried by a shaft 58 journaled in a bearing 59, mounted in an aperture formed in the wall 61 which forms one wall of the recess 13. The end of the shaft 58, as preferably formed, has integral therewith a disc 62 which carries the plate 14 of the carrier 12 for the index prism 11. In the form of the invention now preferred, plate 14 is formed integral with the disc 62 which permits the shaft 58, disc 62, and plate 14, to be forged as a unit.

It will thus be seen that the angular position of the prism 11 may be varied through manipulation of the knob 38, for rotation of the knob causes the worm 56 carried by shaft 41 to drive the sector gear 57 and shaft 58 to which the prism 11 is mounted.

In the form of the invention illustrated, the shaft 41 carries a gear 63 which drives a register 64 through gear 65, carried by a shaft 66, and meshing with the gear 63. The register is provided with a window 67 through which the indicating members of the register are visible. It is now preferred to have the register 64 calibrated to indicate the degrees and use a suitable scale 68 on the operating knob 38 to indicate the minutes of the measurements. As is usual in scales of this type, an index or fiducial line is formed on a stationary member adjacent to the scale and the index 69 is here shown in Fig. 3 as formed on the casing 10.

It is now preferred in the use of the instrument, such as the octant here illustrated, to take a series of measurements and then through arithmetical formula find the average of the measurements taken or by some suitable mechanism, determine the average or median value of the series of measurements. This practice makes for a more accurate measurement and reduces to a minimum the effects of error.

In my application, Serial No. 412,275, filed September 25, 1941, I disclose and claim a median device which is very conveniently adapted for use with the octant of the present invention. The median device of my prior application, above identified, shown here at 71, comprises a number of indicating members 72 viewed through the transparent cover 73 fixed to the casing 10 by fastening means such as the screws 74.

The median device itself forms no part of the present invention although the particular means here employed to couple the device with the operating mechanism and register does form an integral part of the device of the present invention.

In the preferred form of the device of the present invention, the median device is driven by the shaft 66 through the gear train 63 and 65, and the indicating members 72 are normally held against movement with the shaft 66 as fully explained in my prior application, but are seriately released for movement at each measurement by an operating member here shown at 75 and connected to the device through a suitable flexible cable 76. Thus the relative displacement of the indicating members will indicate the relative magnitudes of the measurements taken and the line 77 carried by the cover 73 forms a fiducial means and permits the user to quickly determine the median value of a series of measurements. After the median value has been determined, the indicating members 72 can be returned to their normal position by actuation of the releasing lever 78 as explained in my application Serial No. 412,275.

Although some periscopic effect is had through the particular arrangement of the optical elements of the system, a greater effect may be desired in some uses of the instrument. It may be desirable to mount the instrument in an aircraft with the objective end thereof positioned exteriorly of the aircraft and the ocular tube within the same.

Figures 4, 5, 8:
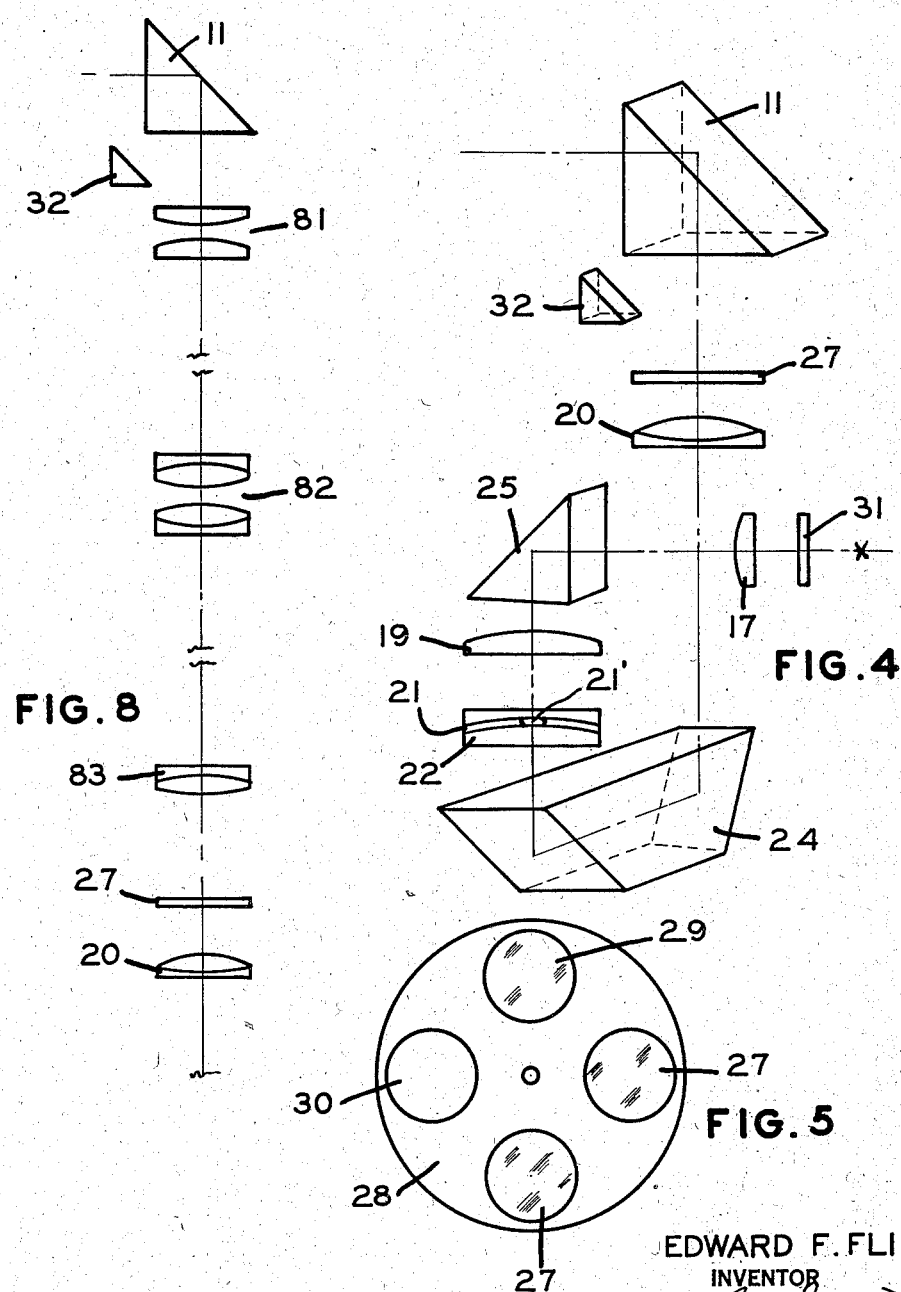
Fig. 4 is a schematic view of the optical system of the present invention.
Fig. 5 is a plan view of the filter holder of the device.
Fig. 8 is a view similar to Fig. 4 but showing a modified form of the optical system.

In such instances the index prism can be elevated to the desired position above the objective 20 to give the particular periscopic action desired but as the distance between the prism and the objective is increased, the size of the field will be decreased. To increase the size of the field, a relay lens system such as shown in Fig. 8 may be used. This system, as illustrated, increases the size of the field without vertically or horizontally reversing the image.

The system as shown in Fig. 8 comprises an objective 81, an erecting system of lenses 82, and a lens 83 which will project the image of the body observed at infinity. With this lens system, the distance between the prism 11 and objective 20 can be increased without sacrificing the size of the field or the orientation of the image.

The octant of the present invention, particularly where the prism 11 is mounted a relatively great distance from the objective, may be used as a panoramic instrument for the entire optical system may be mounted in a suitable casing capable of being mounted for panoramic movement about a vertical axis.

Where the instrument is to be hand held in use, the observer may grasp the handle 39 with his right hand while he manipulates the operating knob 38 with his left. As the operating member 75 of the median device is so located relative to the handle 39 that the index finger of the right hand may be used to actuate the member by depressing the same after each measurement is made, the observer can quickly take his plurality of readings without lowering or moving the instrument.

As most observation blisters today are furnished with a depending hook or the like for suspending an instrument within the same, the instrument of the present invention is formed with means for taking the hook such as the eye 84. Where the instrument is used in an observation blister, the instrument is actually supported by the depending hook, the observer merely holding the instrument steady by pulling down on the handle 39 to prevent sway.

While several embodiments of the device of the present invention have been disclosed, it is to be understood that the invention need not be limited to the embodiments shown and described but is susceptible of modifications falling within the spirit of the invention and the scope of the appended claims.

I claim:

1. In a sextant, a reflector pivotally mounted to move about a horizontal axis; objective lens means positioned below said reflector, the axis of said objective lens means lying in a vertical plane whereby light rays from a distant object may be directed into said lens means by the reflector; a bubble cell having a bubble constrained to move in an arc substantially coincident with the focal plane of said lens means; an eyepiece including an ocular tube, said objective lens means and eyepiece forming an astronomical telescope; reflecting means positioned in optical alignment with said lens means for directing light rays therefrom laterally and thence upwardly through said cell; other reflecting means above the cell for directing the rays laterally and through the ocular tube, the axis of the ocular tube lying in a vertical plane which is spaced from the first-named vertical plane whereby the image of the distant object which is viewed through the ocular tube is normal and erect.

2. In an instrument of the type described, a casing, an index reflector mounted at the upper part of the casing to move in a vertical plane, an objective lens positioned below and in alignment with the index reflector, an eyepiece carried by the casing below a horizontal plane passing through the index reflector, the axis of said eyepiece being horizontally disposed and positioned in a vertical plane which is substantially parallel to the first named vertical plane, a reflecting element positioned in the casing to intersect said axis, reflecting means positioned below and in alignment with said element and objective lens whereby light rays striking the index reflector will be directed into the lens and thence successively reflected into the eyepiece, a member having a reflecting surface inclined to the horizontal, said member being movably mounted on the casing for selective movement into or out of a position below said index reflector whereby said surface will direct light rays from the horizon into the lens.

3. In an instrument of the type described, a casing, an index reflector mounted at the upper part of the casing to move in a vertical plane, an objective lens positioned below and in alignment with the index reflector, an eyepiece carried by the casing below a horizontal plane passing through the index reflector, the axis of said eyepiece being horizontally disposed and positioned in a vertical plane which is substantially parallel to the first named vertical plane, a reflecting element positioned in the casing to intersect said axis, reflecting means positioned below and in alignment with said element and objective lens whereby light rays striking the index reflector will be directed into the lens and thence successively reflected into the eyepiece, and a transparent liquid level positioned below and in alignment with said element, said level having a bubble constrained to move in an arc which is substantially coincident with the focal plane of the objective lens.

EDWARD F. FLINT.